(12) United States Patent
Saito

(10) Patent No.: US 7,181,129 B2
(45) Date of Patent: Feb. 20, 2007

(54) IMAGE DATA RECORDING APPARATUS AND METHOD, AND IMAGE DATA REPRODUCING APPARATUS AND METHOD

(75) Inventor: Osamu Saito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1178 days.

(21) Appl. No.: 09/949,803

(22) Filed: Sep. 12, 2001

(65) Prior Publication Data
US 2002/0031352 A1 Mar. 14, 2002

(30) Foreign Application Priority Data
Sep. 12, 2000 (JP) ............................. 2000-276121

(51) Int. Cl.
*H04N 5/91* (2006.01)
(52) U.S. Cl. .......................................... 386/94; 386/95
(58) Field of Classification Search ................. 386/46, 386/94, 95; 380/239, 268; 713/189
See application file for complete search history.

(56) References Cited

U.S. PATENT DOCUMENTS 6,334,025 B1 * 12/2001 Yamagami ................... 386/96
6,853,731 B1 * 2/2005 Boyle et al. ................. 380/268
6,938,162 B1 * 8/2005 Nagai et al. ................. 713/189

FOREIGN PATENT DOCUMENTS

EP 0773490 A1 * 5/1997

* cited by examiner

Primary Examiner—Huy Nguyen
(74) Attorney, Agent, or Firm—Birch Stewart Kolasch & Birch, LLP

(57) ABSTRACT

A media ID specific to a memory card is recorded on the memory card and a device ID specific to a camera is stored in the camera. If image data and voice data are obtained, these items of data are subjected to a first encryption operation using the device ID as an encryption key. The encrypted data is subjected to a second encryption operation using the media ID as an encryption key, resulting in doubly encrypted data. At playback, the media ID is read from the memory card and is subjected to a first decryption operation. The device ID is read from a device-ID memory and a second decryption operation is performed using the device ID as a decryption key. These IDs cannot be rewritten and decryption cannot be carried out unless these IDs are used. Even if data is copied without authorization, therefore, the data cannot be decrypted. This makes it possible to prevent the unauthorized utilization of the data.

10 Claims, 7 Drawing Sheets

IMAGE DATA RECORDING APPARATUS AND METHOD, AND IMAGE DATA REPRODUCING APPARATUS AND METHOD

BACKGROUND OF THE INVENTION

1. Field of the Invention

This invention relates to an apparatus and method for recording image data on a removable recording medium, and to an apparatus and method for reproducing image data that has been recorded on a removable recording medium.

2. Description of the Related Art

In an image data recording apparatus such as a digital still camera, often the image data is recorded on a recording medium such as a memory card. Since the memory card can be removably inserted into the digital still camera, it is conceivable that the memory card may be extracted from the camera and that the image data recorded on the memory card may be copied and utilized without authorization.

Such unauthorized copying is not limited to image data and includes the unauthorized copying of voice (audio) data as well.

DISCLOSURE OF THE INVENTION

Accordingly, an object of the present invention is to prevent the unauthorized utilization of image data.

According to a first aspect of the present invention, the foregoing object is attained by providing an image data recording apparatus for recording image data on a removable recording medium, comprising: a reading unit for reading a first identification code that has been recorded on the recording medium and that is specific to the recording medium; a first encryption unit (first encryption means) for encrypting image data using one of a second identification code, which is specific to the image data recording apparatus, and the first identification code read by the first reading unit; a second encryption unit (second encryption means) for further encrypting the image data, which has been encrypted by the first encryption unit, using the other of the first and second identification codes; and a recording controller for recording the image data, which has been encrypted by the second encryption unit, on the recording medium.

The first aspect of the present invention provides also a method suited to the above-described apparatus. Specifically, there is provided a method of recording image data in an image data recording apparatus for recording image data on a removable recording medium, comprising the steps of: reading a first identification code that has been recorded on the recording medium and that is specific to the recording medium; encrypting image data using one of a second identification code, which is specific to the image data recording apparatus, and the first identification code that has been read; further encrypting the encrypted image data using the other of the first and second identification codes; and recording the further encrypted image data on the recording medium.

In accordance with the first aspect of the present invention, a first identification code (a unique ID, such as a serial number) specific to a recording medium is recorded on the recording medium removably inserted into an image data recording apparatus, and this first identification code is read.

Image data is encrypted using either the read first identification code or a second identification code that is specific to the image data recording apparatus. The encrypted data is encrypted further using the other of the first and second identification codes. The further encrypted image data is recorded on the recording medium.

Thus, image data is doubly encrypted using the first and second identification codes. This means that the original image data cannot be decrypted unless both the first and second identification codes are known. This makes it possible to prevent the unauthorized utilization of image data.

The first identification code that has been recorded on the recording medium is recorded in an unrewritable area and therefore cannot be rewritten. Even if the image data that has been recorded on the recording medium is copied, the first identification code that has been recorded in the unrewritable area will not be copied. The image data is encrypted using the first identification code. Even if the image data is copied without authorization, therefore, the user who has made the unauthorized copy will not know the content of the first identification code and will not be able to decrypt the image data. This makes it impossible for the image data to be utilized without authorization.

The first aspect of the present invention may be provided with a reproducing function that is based upon a second aspect described below.

The second aspect of the present invention reproduces image data that has been recorded on the basis of the first aspect. Specifically, the second aspect of the present invention provides an image data reproducing apparatus for reproducing image data that has been recorded on a removable recording medium, comprising: a first reading unit for reading a first identification code that has been recorded on the recording medium and that is specific to the recording medium; a second reading unit, wherein image data that has been encrypted using one of a second identification code specific to the image data recording apparatus and the first identification code read by the first reading unit is further encrypted using the other identification code of the first and second identification codes and this further encrypted data is read from the recording medium by the second reading unit; a first decryption unit (first decryption means) for decrypting the image data, which has been read by the second reading unit, using one of the first and second identification codes; and a second decryption unit (second decryption means) for further decrypting the image data, which has been decrypted by the first decryption unit, using the other of the first and second identification codes.

The second aspect of the present invention provides also a method suited to the above-described apparatus. Specifically, there is provided a method of reproducing image data in an image data reproducing apparatus for reproducing image data that has been recorded on a removable recording medium, comprising the steps of: reading image data from the recording medium, wherein image data that has been encrypted using one of a first identification code that has been recorded on the recording medium and that is specific to the recording medium and a second identification code specific to the image data recording apparatus is further encrypted using the other of the first and second identification codes and this further encrypted image data is the image data that is read from the recording medium; decrypting the read image data using one of the first and second identification codes; and further decrypting the decrypted image data using the other of the first and second identification codes.

In accordance with the second aspect of the present invention, a first identification code that has been stored on a recording medium is read. Doubly encrypted image data that has been stored on the recording medium is decrypted using either the first identification code or a second identification code that is specific to the image data recording apparatus. The decrypted data is further decrypted using the other of the first and second identification codes.

Thus the doubly encrypted image data can be decrypted to the original image data to reproduce the original image data.

According to a third aspect of the present invention, there is provided an image data recording apparatus for recording image data on a removable recording medium, comprising: a reading unit for reading an identification code that has been recorded on the recording medium and that is specific to the recording medium; an image data encryption unit (image data encryption means) for encrypting image data using the identification code read by the reading unit; a sound data encryption unit (sound data encryption means) for encrypting sound data, which is related to the image data, using the identification code read by the reading unit; and a recording controller for recording, on the recording medium, the image data that has been encrypted by the image data encryption unit, the sound data that has been encrypted by the sound data encryption unit and link data representing the relationship between the image data and sound data.

The third aspect of the present invention provides also a method suited to the above-described apparatus. Specifically, there is provided a method of recording image data in an image data recording apparatus for recording image data on a removable recording medium, comprising the steps of: reading an identification code that has been recorded on the recording medium and that is specific to the recording medium; encrypting image data and sound data, which is related to the image data, using the read identification code; and recording, on the recording medium, the encrypted image data, the encrypted sound data and link data representing the relationship between the image data and sound data.

In accordance with the third aspect of the present invention, an identification code specific to the recording medium is read. Image data and sound data related to this image data is encrypted using the read identification code. The encrypted image data, the encrypted sound data and link data representing the relationship between the image data and sound data is recorded on the recording medium.

At playback, the identification code is read from the recording medium. Further, either the encrypted image data or encrypted sound data is read from the recording medium and is decrypted using the identification code. Further, the link data is read from the recording medium and the other of the encrypted sound data or encrypted image data is read from the recording medium in association with the decrypted image data or sound data. The other of the sound data or image data that has been read is then decrypted.

Thus the third aspect of the present invention also is such that neither the image data nor sound data can be decrypted unless the identification code specific to the recording medium is known. A user who has made an unauthorized copy can be prevented from decrypting the copy and from utilizing the image data and sound data without authorization.

The third aspect of the present invention may be provided with a reproducing function that is based upon a fourth aspect described below.

The fourth aspect of the present invention reproduces image data and sound that has been recorded on the basis of the first aspect. Specifically, the fourth aspect of the present invention provides an image data reproducing apparatus for reproducing image data that has been recorded on a removable recording medium, comprising: an identification code reading unit for reading an identification code that has been recorded on the recording medium and that is specific to the recording medium; a first data reading unit for reading, from the recording medium, one of image data that has been encrypted using the identification code and sound data that has been encrypted using the identification code; a first decryption unit (first decryption means) for decrypting image data or sound data, which has been read by the first data reading unit, using the identification code read by the identification code reading means; a link data reading unit (link data reading means) for reading, from the recording medium, link data representing the relationship between one of the image data and sound data that has been read by said reading unit and the sound data or image data regarding the read image data or sound; a second data reading unit for reading, from the recording medium, the other of the encrypted sound data and image data related by the link data that has been read by the link data reading unit; and a second decryption unit (second decryption means) for decrypting the sound data or image data, which has been read by the second data reading unit, using the identification code.

The fourth aspect of the present invention provides also a method suited to the above-described apparatus. Specifically, there is provided a method of reproducing image data in an image data reproducing apparatus for reproducing image data that has been recorded on a removable recording medium, comprising the steps of: reading, from the recording medium, an identification code that has been recorded on the recording medium and that is specific to the recording medium, and one of image data that has been encrypted using the identification code and sound data that has been encrypted using the identification code; decrypting the read image data or read sound data using the read identification code; reading, from the recording medium, link data representing the relationship between one of the read image data and sound data and the sound data or image data regarding the read image data or sound data; reading, from the recording medium, the other of the encrypted sound data and image data related by the read link data; and decrypting the read sound data or image data using the identification code.

In accordance with the fourth aspect of the present invention, mutually related image data and sound data that has been encrypted can be decrypted. Moreover, from one of the image data and sound data, the other data can be read out on the basis of the link data.

The link data also may be encrypted by the identification code. In such case, a third decryption unit (third decryption means) would be provided for decrypting the link data, which has been read by the link data reading unit, using the identification code.

Thus, the fact that sound data or image data related to image data or sound data exists is known only by decrypting the link data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
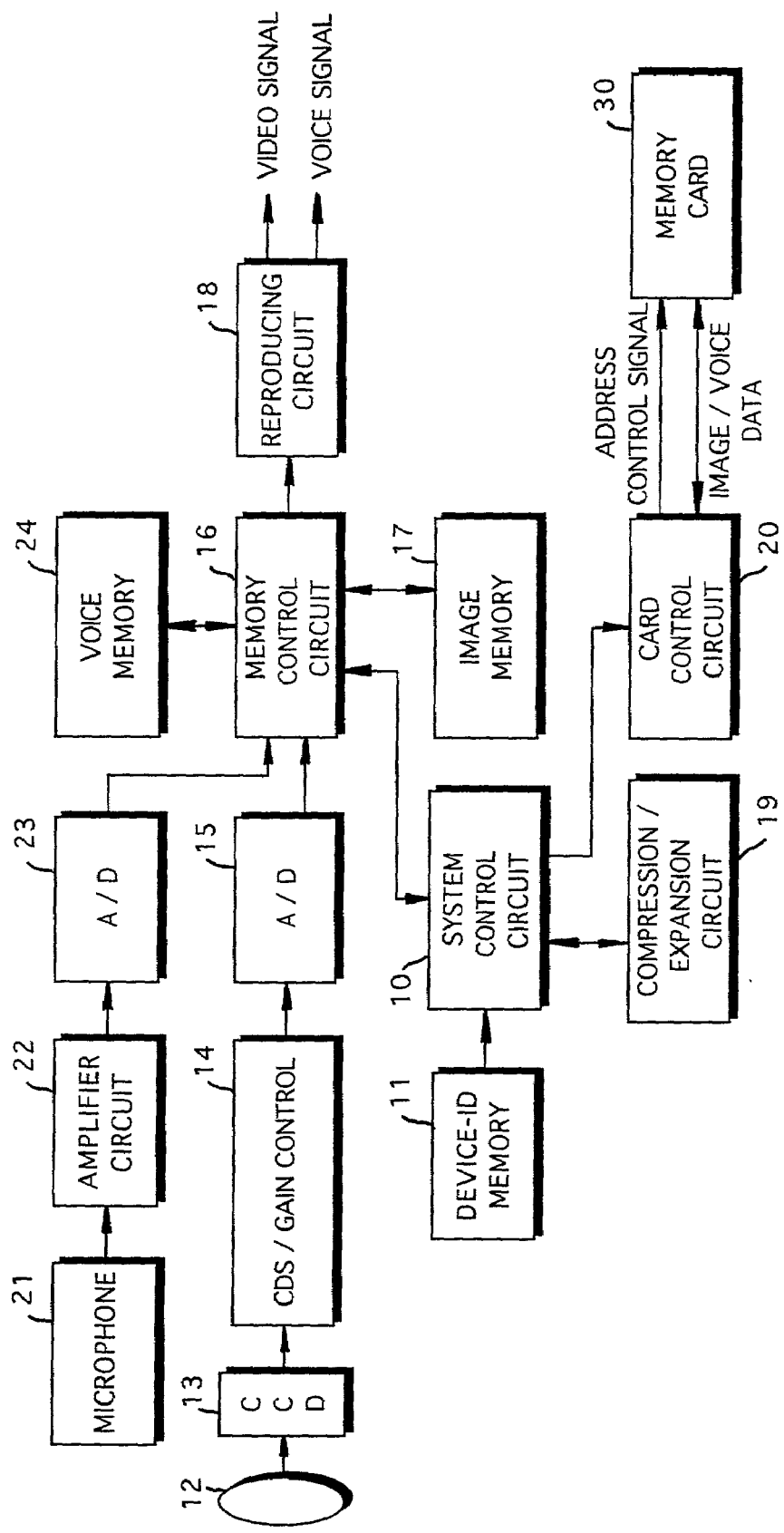
FIG. 1 is a block diagram illustrating the electrical construction of a digital still camera according to the present invention.

FIG. 1 is a block diagram illustrating the electrical construction of a digital still camera according to an embodiment of the present invention.

In the digital still camera according to this embodiment, image data (and voice data also if necessary) obtained by sensing an image is encrypted using a device ID specific to the camera, and the image data thus encrypted is further encrypted using a media ID specific to a memory card 30. The encrypted image data is recorded on the memory card 30. Since data such as image data is encrypted using two unique IDs, decryption cannot be performed unless both unique IDs are known. This makes it possible to prevent the unauthorized utilization of data such as image data recorded on the memory card 30. Further details will become apparent from the description that follows.

The overall operation of the digital still camera is controlled by a system control circuit 10.

A device-ID memory 11 storing a device ID specific to the camera is connected to the system control circuit 10. The device-ID memory 11 is a non-volatile memory in which the device ID cannot be rewritten.

The image of a subject is formed on the photoreceptor surface of a CCD 13 by an imaging lens 12. The CCD 13 outputs a video signal representing the image of the subject. The video signal representing the image of the subject is subjected to correlated double sampling and gain adjustment processing in a CDS (Correlated Double Sampling)/gain control circuit 14, and the processed signal is input to an analog/digital conversion circuit 15.

The image data that has been converted by the analog/digital conversion circuit 15 simply passes through a memory control circuit 16 and enters a reproducing circuit 18. The latter executes predetermined reproducing processing and outputs a video signal for display. The video signal output from the reproducing circuit 18 is applied to a display unit, whereby the image of the subject obtained by imaging is visibly displayed.

If a shutter-release button (not shown) is pressed, the image data that has been output from the analog/digital conversion circuit 15 is stored temporarily in an image memory 17. The image data is read out of the image memory 17 and input to a compression/expansion circuit 19 via the memory control circuit 16 and system control circuit 10. The compression/expansion circuit 19 subjects the image data to compression processing such as processing in accordance with the JPEG (Joint Photographic Experts Group) standard. The image data that has been compressed is applied to the memory card 30 via the system control circuit 10 and a card control circuit 20, and the data is recorded in a recording area having an address designated by an address control signal.

The digital still camera according to this embodiment can also store voice data, which represents voice, on the memory card 30. The digital still camera is provided with a microphone 21. Voice input to the microphone 21 is output from the microphone 21 upon being converted to an analog voice signal thereby. The voice signal output from the microphone 21 is amplified by an amplifier circuit 22 and the amplified voice signal is converted to digital voice data by an analog/digital conversion circuit 23. The digital data simply passes through the memory control circuit 16, is subjected to predetermined reproducing processing in the reproducing circuit 18 and is output as a playback signal. The playback signal is applied to speakers or the like, whereby voice is output.

If a recording button (not shown) is pressed, the voice data output from the analog/digital conversion circuit 23 as set forth above is applied to the compression/expansion circuit 19, via the memory control circuit 16 and system control circuit 10, and is subjected to voice compression such as compression in compliance with the MP-3 (MPEG Audio Layer-3) standard. The compressed voice data is recorded on the memory card 30 via the system control circuit 10 and card control circuit 20. It goes without saying that the voice data also is recorded in a recording area having an address designated by an address control signal in a manner similar to that of the image data.

The system control circuit 10 further has a function for encrypting image data and voice data and a function for decrypting the same. More specifically, image data and voice data encrypted in a manner described below is recorded on the memory card 30 and the encrypted image data and voice data is decrypted to be reproduced.

The digital still camera according to this embodiment also has a reproducing (playback) function.

If an image playback mode is set, image data that has been recorded on the memory card 30 is read by the card control circuit 20. The image data is sent to the compression/expansion circuit 19 via the card control circuit 20 and system control circuit 10 and is expanded by the compression/expansion circuit 19. The expanded image data is applied to the reproducing circuit 18 via the system control circuit 10 and memory control circuit 16 and the reproduced video signal is output.

If a voice playback mode is set, voice data that has been recorded on the memory card 30 is read. The read voice data is input to the compression/expansion circuit 19 via the card control circuit 20 and system control circuit 10 and is expanded by the compression/expansion circuit 19. The expanded voice data is applied to the reproducing circuit 18 via the system control circuit 10 and memory control circuit 16, whereby the reproduced voice signal is output.

Figure 2:
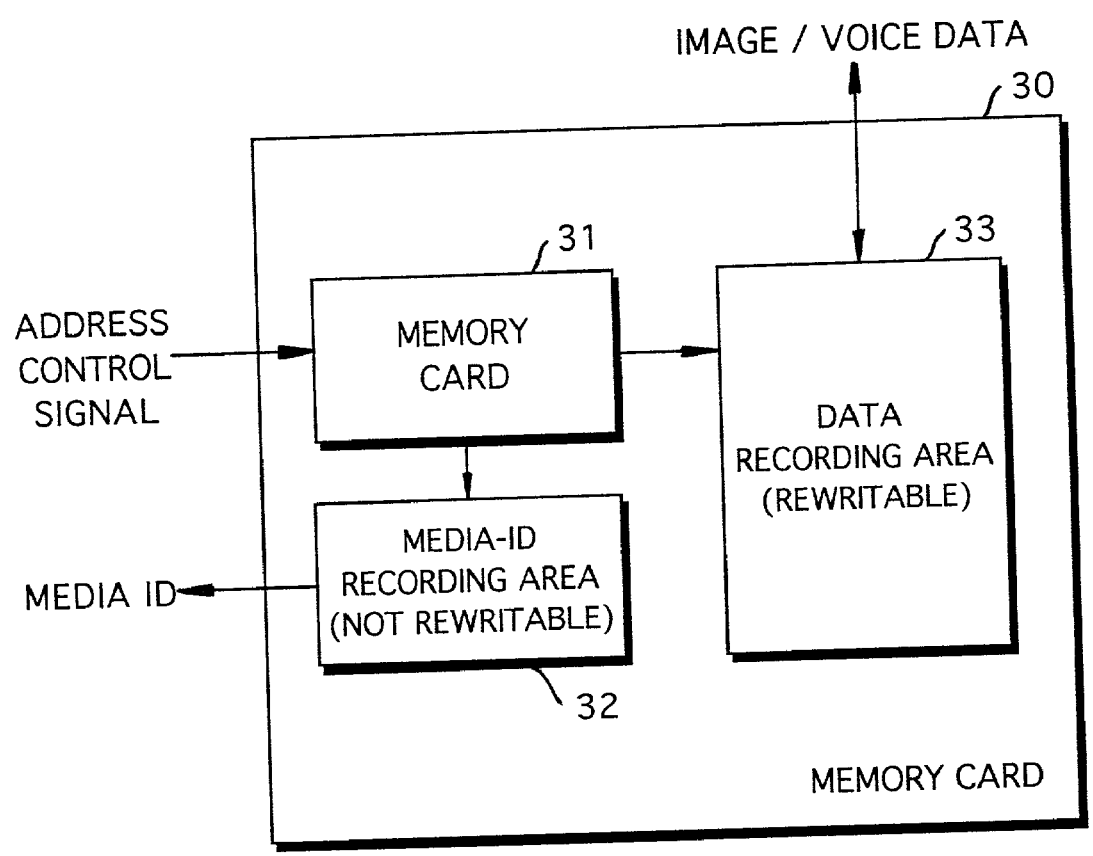
FIG. 2 is a block diagram illustrating the electrical construction of a memory card.

FIG. 2 is a block diagram illustrating the electrical construction of the memory card 30.

The memory card 30 includes a media-ID recording area 32 and a data recording area 33. The media-ID recording area 32 utilizes a non-volatile memory in which an ID specific to the memory card 30 is recorded in unrewritable fashion. The data recording area 33 records image data and voice data in rewritable fashion.

The memory card 30 further includes an address control circuit 31. Image data and voice data is written to the data recording area 33 by the address control circuit 31 at an address designated by the address control signal from the card control circuit 20, and image data and voice data that has been recorded in the data recording area 33 is read by the address control circuit 31. Of the data that has been recorded in the media-ID recording area 32, a media ID that has been stored at the address designated by an address signal from the address control circuit 31 is read.

Figure 3:
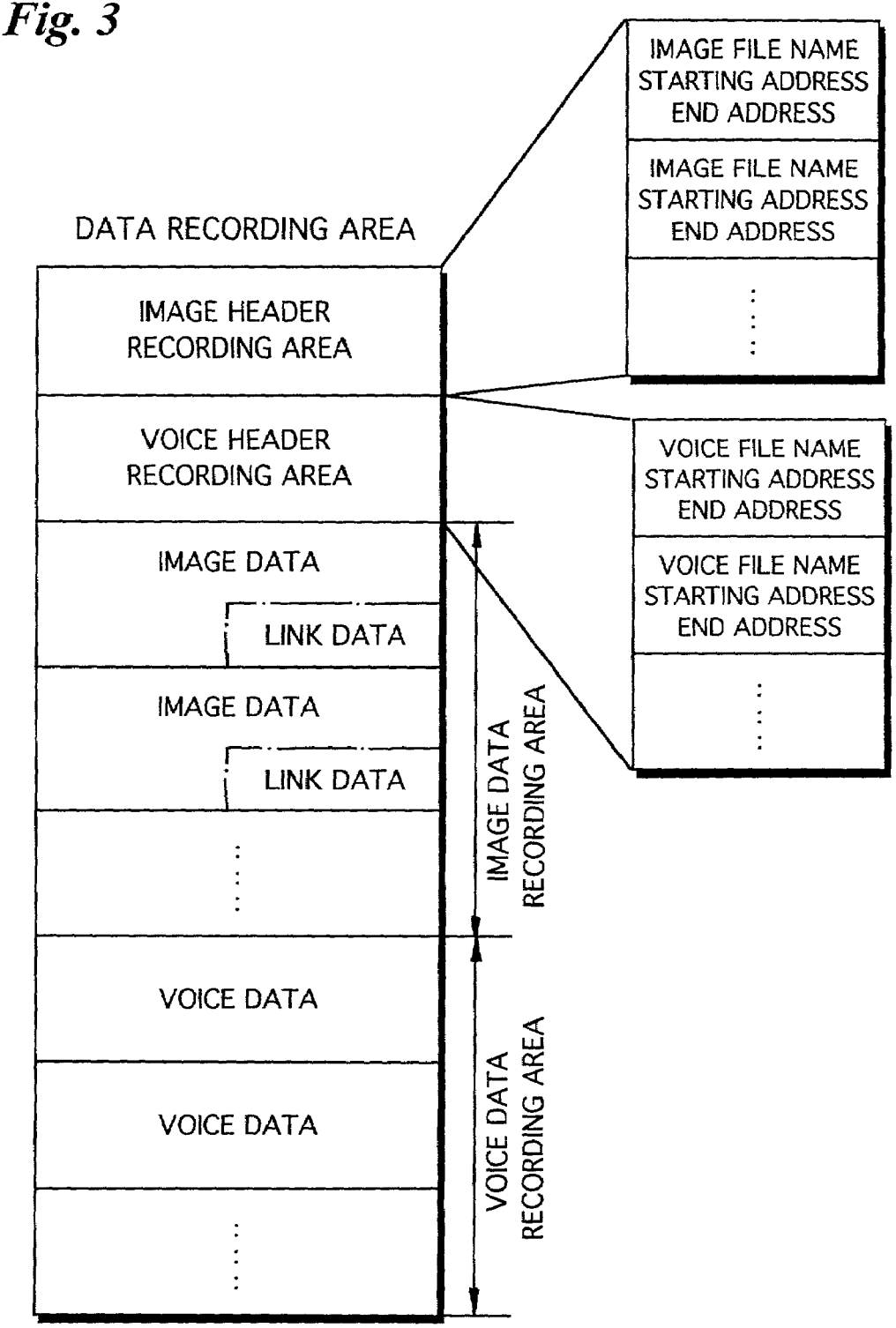
FIG. 3 illustrates the structure of a data recording area.

FIG. 3 illustrates the data recording area included in the memory card 30.

The data recording area includes an image header recording area, a voice header recording area, an image data recording area and a voice data recording area.

The image header recording area records, for each image file, an image file name of the image file containing image data that has been recorded in the image data recording area, a starting address and an end address of the image file.

The voice header recording area records, for each voice file, a voice file name of the voice file containing voice data that has been recorded in the voice data recording area, a starting address and an end address of the voice file.

The image data recording area records, for each image file, image data provided by the digital still camera in the manner set forth above. In a case where voice data related to image data exists, link data can also be added on following EOI (End of Image), which indicates end of the image data of an image file.

The voice data recording area records, for each voice file, voice data provided by the digital still camera in the manner set forth above.

Figure 4:
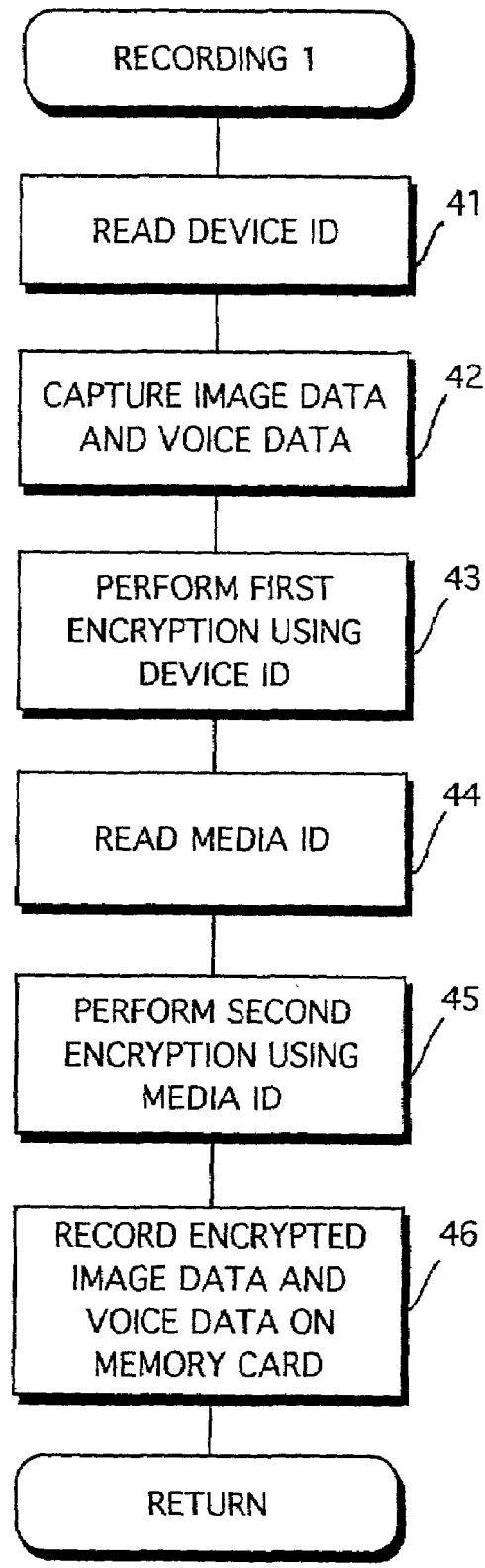
FIG. 4 is a flowchart illustrating recording processing according to a first embodiment.

FIG. 4 is a flowchart illustrating recording processing executed by the digital still camera according to this embodiment.

First, a device ID that has been stored in the device-ID memory 11 is read (step 41). Image data is obtained by sensing the image of a subject and voice data is obtained by inputting voice from the microphone 21 (step 42). Image data obtained by image sensing is stored temporarily in the image memory 17 and voice data is stored temporarily in a voice memory 24. Image data is read from the image memory 17 and input to the system control circuit 10. The latter subjects the image data to a first encryption operation using the read device ID as the encryption key (step 43). The encrypted image data is applied to the image memory 17, where the image data is stored again. Voice data is read from the voice memory 24 and the system control circuit 10 subjects the voice data to a first encryption operation using the read device ID as the encryption key (step 43). The encrypted voice data is applied to the voice memory 24, where the voice data is stored again.

The media ID that has been recorded in the media recording area of the memory card 30 is read and applied to the system control circuit 10 (step 44).

The image data obtained by the first encryption operation is read from the image memory 17 and input to the system control circuit 10. The latter subjects the encrypted image data to a second encryption operation using the media ID as the encryption key (step 45). The voice data obtained by the first encryption operation is read from the voice memory 24 and input to the system control circuit 10. The latter subjects the encrypted voice data to a second encryption operation using the media ID as the encryption key (step 45).

The image data obtained by the second encryption operation and the voice data obtained by the second encryption operation is applied to the memory card 30 via the card control circuit 20, and these items of data are recorded in the data recording area (step 46).

It goes without saying that compression processing is applied to the image data and voice data as necessary. The compressed image data and voice data may be encrypted if desired. Further, in the above-described embodiment, both the image data and voice data are encrypted, though only the image data or only the voice data may be encrypted if desired.

Figure 5:
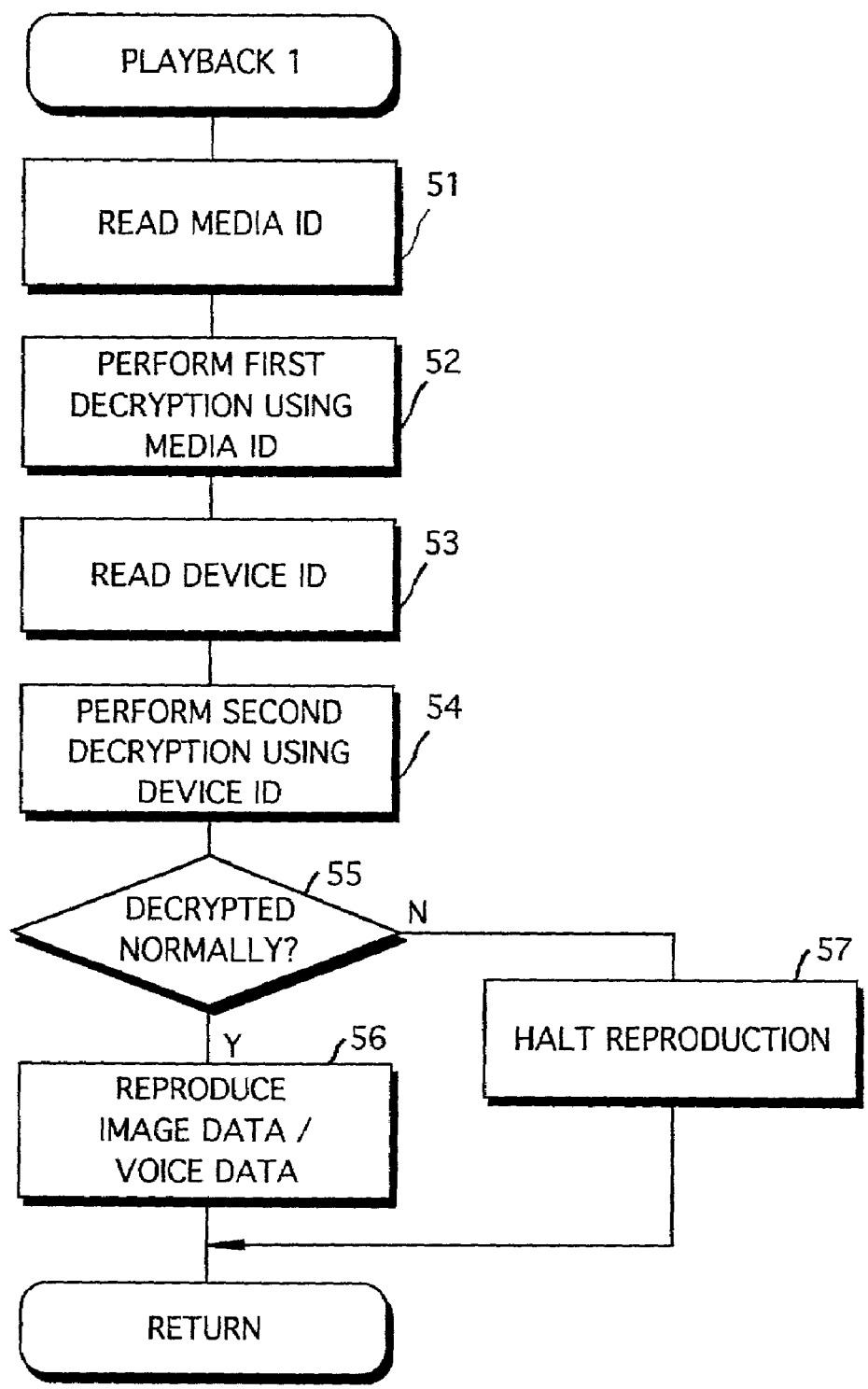
FIG. 5 is a flowchart illustrating reproducing processing according to the first embodiment.

FIG. 5 is a flowchart illustrating reproducing processing executed by the digital still camera according to this embodiment.

The memory card 30 on which at least one of image data and voice data to be reproduced has been stored is inserted into the digital still camera. The media ID is read from the media ID recording area of the memory card 30 (step 51). Further, encrypted image data and voice data that has been recorded in the data recording area of memory card 30 is read, the image data is stored temporarily in the image memory 17 and the voice data is stored temporarily in the voice memory 24.

Encrypted image data is read from the image memory 17 and applied to the system control circuit 10. The media ID read from the memory card 30 also is applied to the system control circuit 10 and the image data is decrypted using the media ID as the decryption key (first decryption operation; step 52). The decrypted image data is applied to the image memory 17, where the data is stored again.

Similarly, encrypted voice data is read from the voice memory 24 and applied to the system control circuit 10. The latter decrypts the voice data using the media ID as the decryption key (first decryption operation; step 52). The decrypted voice data is applied to the voice memory 24, where the data is stored again.

Next, the device ID is read from the device-ID memory 11 (step 53).

The encrypted image data is read from the image memory 17 again. (Since the image data was doubly encrypted using the device ID and media ID, it is still encrypted because decryption has been performed only once using the media ID as the decryption key.) The image data is applied to the system control circuit 10, which proceeds to subject the image data to a second decryption operation using the device ID as the decryption key (step 54). The encrypted voice data is read from the voice memory 24 again. This voice data is input to the system control circuit 10, which proceeds to subject the voice data to a second decryption operation using the device ID as the decryption key (step 54).

When the second decryption operation has been carried out, the image data and voice data should both have been decrypted into the original data. Accordingly, whether decryption has been performed normally can be checked by detecting the image file name and voice file name that have been recorded in the header recording area. If decryption has been performed normally ("YES" at step 55), then the decrypted image data and voice data are both applied to the reproducing circuit 18, where the data is subjected to reproducing processing (step 56). The video signal obtained by reproduction is applied to a display unit, whereby the image is visibly displayed. The voice signal obtained by reproduction is applied to a speaker, whereby a voice output is produced.

If decryption has not been performed normally ("NO" at step 55), then processing for playback is halted (step 57). If necessary, the user would be notified of the fact that decryption could not be performed normally.

Decryption cannot be carried out unless both the device ID and media ID are known. Moreover, neither the device ID nor the media ID can be rewritten, and even if image data and voice data that has been recorded on the memory card 30 is copied, the media ID will not be copied. Even if it is attempted to decrypt copied image data and voice data, normal decryption cannot be achieved. This makes it possible to prevent unauthorized utilization of image data and voice data.

In the above-described embodiment, whether decryption has been performed normally is not judged when the first decryption operation is carried out. However, by adding an error correction code such as a CRC (cyclic redundancy check) onto data subjected to the first encryption operation at the time of recording and then performing error detection when the first decryption operation is carried out at playback, it can be determined whether the first decryption operation has been performed normally. In this case, a circuit for adding on an error detection code and a circuit for detecting the error code would be provided as necessary. It goes without saying that the adding on and the detection of the error detection code can be implemented by software.

Figure 6:
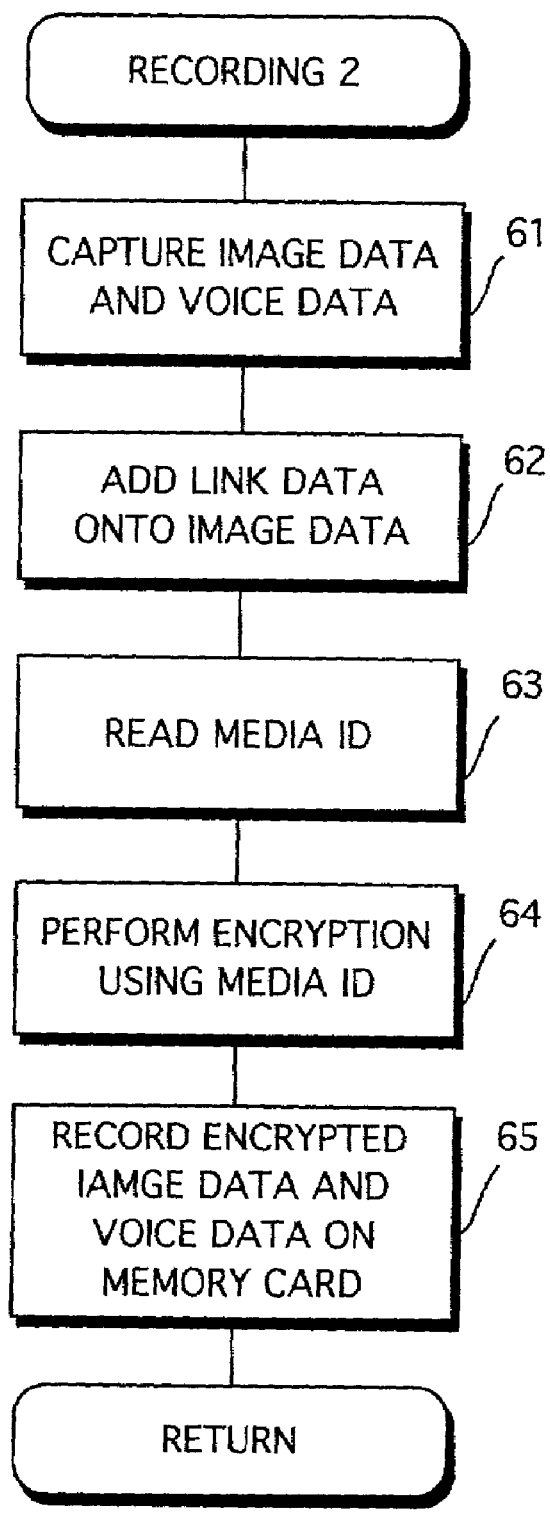
FIG. 6 is a flowchart illustrating recording processing according to a second embodiment.

FIG. 6 is a flowchart illustrating recording processing executed by the digital still camera according to a second embodiment.

In the processing shown in FIG. 6, link data representing the relationship between image data and voice data related to this image data also is recorded on the memory card 30.

As described above, image data and voice data is obtained, the image data is stored in the image memory 17 and the voice data is stored in the voice memory 24 (step 61). Furthermore, link data indicating that the image data and voice data are related to each other (an example of the link data being the file name of a voice file containing voice data related to image data) is added onto the image data (i.e., is added on following the EOI of the image file, as mentioned earlier) (step 62). When voice also is input during the image of a subject, link data would be added onto the image data on the assumption that the image data obtained by imaging of the subject and the voice data obtained by input of voice are related to each other.

The media ID is read from the memory card 30 (step 63) and the image data and voice data is encrypted using the media ID as the encryption key (step 64). The encrypted image data (since link data has been added on, the link data also is encrypted) and the voice data is applied to and recorded on the memory card 30 (step 65) (see FIG. 3).

Figure 7:
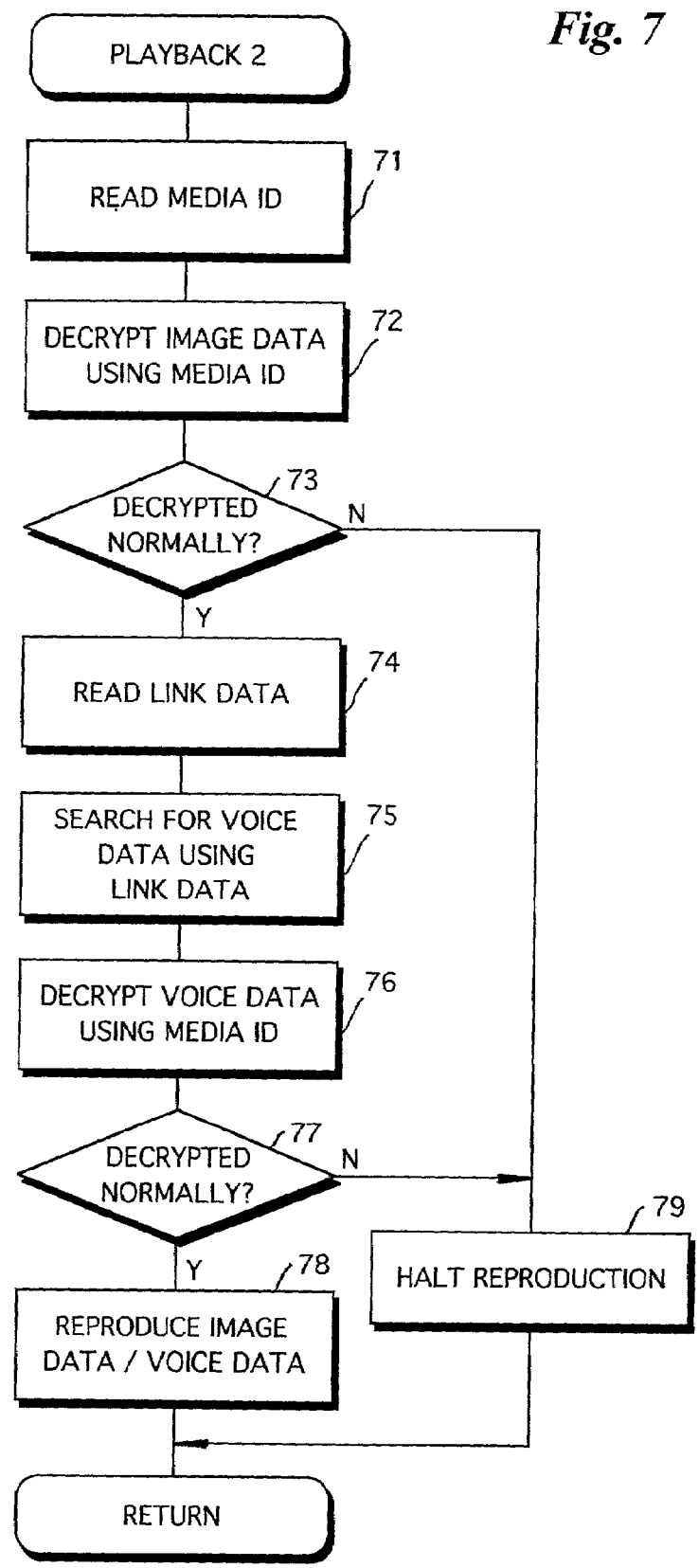
FIG. 7 is a flowchart illustrating reproducing processing according to the second embodiment.

FIG. 7 is a flowchart illustrating reproducing processing executed by the digital still camera according to the second embodiment.

The media ID is read from the media-ID recording area 32 of the memory card 30 (step 71). The encrypted image data is decrypted using the read media ID as the decryption key (step 72). Since link data has been added onto the image data, the link data also is decrypted by decrypting the image data.

If it is confirmed, as by checking the image file name, that the image data has been decrypted normally ("YES" at step 73), then the link data that has been added onto the image data is read (step 74). Voice data related to the image data is searched for in the link data that has been read (step 75). If voice data is found, this voice data is read from the memory card 30 and applied to the system control circuit 10, which proceeds to decrypt the voice data using the media ID (step 76).

By checking the file name, for example, of the voice data, it is determined whether the voice data has been decrypted normally (step 77). If it is determined that the voice data has been decrypted normally ("YES" at step 77), then the decrypted image data and voice data is applied to the reproducing circuit 18, which subjects this data to reproducing processing (step 78).

If either the image data or voice data has not been decrypted normally ("NO" at step 73 or "NO" at step 77), then reproducing processing is suspended.

Since link data has been added on, voice data related to the image data can be recorded on the memory card in association with the image data. While an image is being displayed at playback, voice related to this image can be output.

Further, link data also has been encrypted using the medium ID as the encryption key. This means that the link data also cannot be decrypted unless the media ID is known. Only an authorized user can search for voice data related to image data and can output voice related to an image while the image is being displayed.

Furthermore, in the foregoing embodiments, the first encryption processing is executed using the media ID. However, an arrangement may be adopted in which, in a manner similar to the foregoing embodiments, the first encryption processing is performed using the device ID and the second encryption processing is applied to the encrypted image data and voice data using the media ID.

As many apparently widely different embodiments of the present invention can be made without departing from the spirit and scope thereof, it is to be understood that the invention is not limited to the specific embodiments thereof except as defined in the appended claims.

What is claimed is:

1. An image data recording apparatus for recording image data on a removable recording medium, comprising:
   a reading unit for reading a first identification code that has been recorded on the recording medium and that is specific to the recording medium;
   a first encryption unit for encrypting image data using one of a second identification code, which is specific to the image data recording apparatus, and the first identification code read by said first reading unit;
   a second encryption unit for further encrypting the image data, which has been encrypted by said first encryption unit, using the other of the first and second identification codes; and
   a recording controller for recording the image data, which has been encrypted by said second encryption unit, on the recording medium.

2. An image data reproducing apparatus for reproducing image data that has been recorded on a removable recording medium, comprising:
   a first reading unit for reading a first identification code that has been recorded on the recording medium and that is specific to the recording medium;
   a second reading unit, wherein image data that has been encrypted using one of a second identification code specific to the image data recording apparatus and the first identification code read by said first reading unit is further encrypted using the other identification code of the first and second identification codes and this further encrypted data is read from the recording medium by said second reading unit;
   a first decryption unit for decrypting the image data, which has been read by said second reading unit, using one of the first and second identification codes; and
   a second decryption unit for further decrypting the image data, which has been decrypted by said first decryption unit, using the other of the first and second identification codes.

3. An image data recording apparatus for recording image data on a removable recording medium, comprising:
   a reading unit for reading an identification code that has been recorded on the recording medium and that is specific to the recording medium;

an image data encryption unit for encrypting image data using the identification code read by said reading unit;

a sound data encryption unit for encrypting sound data, which is related to the image data, using the identification code read by said reading unit;

a link data encryption unit for encrypting link data, which represents the relationship between the image data and the sound data, using the identification code read by said reading unit; and a recording controller for recording, on the recording medium, the image data that has been encrypted by said image data encryption unit, the sound data that has been encrypted by said sound data encryption unit and the link data that has been encrypted by said link data encryption unit.

4. An image data reproducing apparatus for reproducing image data that has been recorded on a removable recording medium, comprising:

an identification code reading unit for reading an identification code that has been recorded on the recording medium and that is specific to the recording medium;

a first data reading unit for reading, from the recording medium, one of image data that has been encrypted using the identification code and sound data that has been encrypted using the identification code;

a first decryption unit for decrypting image data or sound data, which has been read by said first data reading unit, using the identification code read by said identification code reading unit;

a link data reading unit for reading, from the recording medium, link data representing a relationship between the image data and the sound data, wherein the link data has been encrypted using the identification code;

a link data decryption unit for decrypting the link data, which has been read by said link data reading unit, using the identification code;

a second data reading unit for reading, from the recording medium, the other of the encrypted sound data and the image data based on the decrypted link data; and a second decryption unit for decrypting the sound data or the image data, which has been read by the second data reading unit, using the identification code.

5. A method of recording image data in an image data recording apparatus for recording image data on a removable recording medium, comprising the steps of:

reading a first identification code that has been recorded on the recording medium and that is specific to the recording medium;

encrypting image data using one of a second identification code, which is specific to the image data recording apparatus, and the first identification code that has been read;

further encrypting the encrypted image data using the other of the first and second identification codes; and recording the further encrypted image data on the recording medium.

6. A method of reproducing image data in an image data reproducing apparatus for reproducing image data that has been recorded on a removable recording medium, comprising the steps of:

reading image data from the recording medium, wherein image data that has been encrypted using one of a first identification code that has been recorded on the recording medium and that is specific to the recording medium and a second identification code specific to the image data recording apparatus is further encrypted using the other of the first and second identification codes and this further encrypted image data is the image data that is read from the recording medium;

decrypting the read image data using one of the first and second identification codes; and further decrypting the decrypted image data using the other of the first and second identification codes.

7. A method of recording image data in an image data recording apparatus for recording image data on a removable recording medium, comprising the steps of:

reading an identification code that has been recorded on the recording medium and that is specific to the recording medium;

encrypting image data and sound data, which is related to the image data, using the read identification code;

encrypting link data representing the relationship between the image data and the sound data; and, recording, on the recording medium, the encrypted image data, the encrypted sound data and the encrypted link data.

8. A method of reproducing image data in an image data reproducing apparatus for reproducing image data that has been recorded on a removable recording medium, comprising the steps of:

reading, from the recording medium, an identification code that has been recorded on the recording medium and that is specific to the recording medium, and reading one of image data that has been encrypted using the identification code and sound data that has been encrypted using the identification code;

decrypting the read image data or the read sound data using the read identification code;

reading, from the recording medium, link data representing relationship between the image data and the sound data, wherein the link data has been encrypted using the identification code;

decrypting the link data using the identification code;

reading, from the recording medium, the other of the encrypted sound data and the image data based on the decrypted link data; and decrypting the other of the read sound data or the image data using the identification code.

9. The apparatus according to claim 3, wherein the link data is added onto the image data.

10. The apparatus according to claim 4, wherein the link data is added onto the image data.

* * * * *